Feb. 26, 1952     H. W. McPHERSON     2,587,357

VALVE

Filed Aug. 6, 1947

INVENTOR.
HAL W. McPHERSON
BY Kenyon & Kenyon
ATTORNEYS

Patented Feb. 26, 1952

2,587,357

UNITED STATES PATENT OFFICE 2,587,357

VALVE

Hal W. McPherson, Chicago, Ill., assignor to The Skinner Chuck Company, Norwalk, Conn., a corporation of Connecticut Application August 6, 1947, Serial No. 766,668

4 Claims. (Cl. 137—144)

This invention relates to valves and more especially to solenoid-operated valves.

An object of this invention is a valve in which the pressure of the fluid to be controlled is utilized under the control of a solenoid-actuated valve to determine the setting of the valve whereby a small solenoid may be utilized to control flow through a large orifice.

A further object of this invention is a three-way valve in which the pressure inlet can be at either the normally open or the normally closed port and may be easily converted into a two-way valve by closing one outlet port.

It is a still further object of this invention to provide a magnetically operated pilot valve which is unfailingly reliable in operation in a wide variety of conditions of temperature, pressure and the like.

Other objects, novel features and advantages of this invention will become apparent from the following specification and accompanying drawings, wherein.

Figure 1:
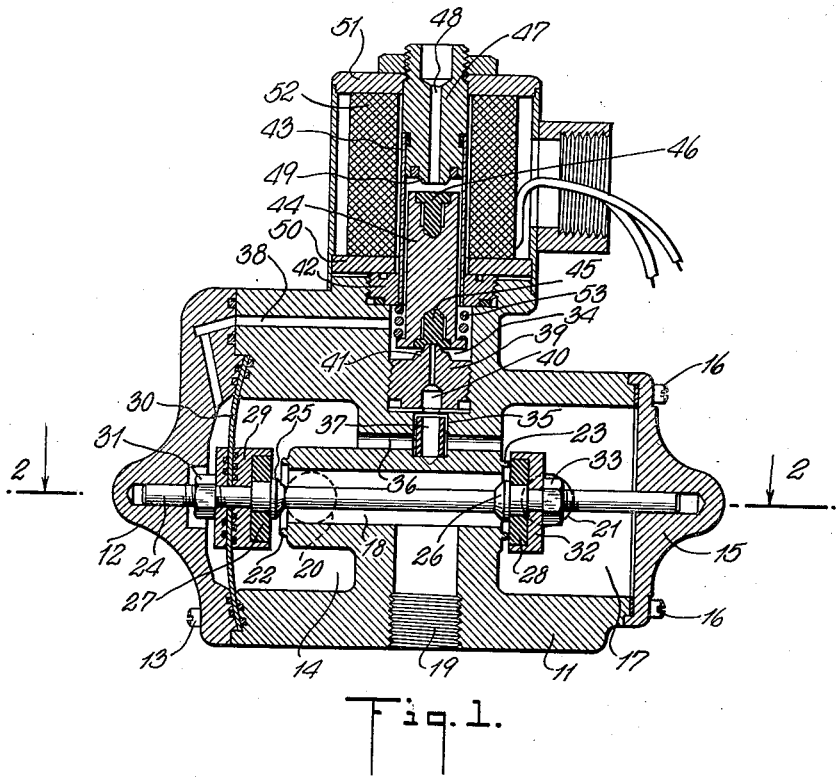
Fig. 1 is a vertical section through a valve embodying the invention.
Figure 2:
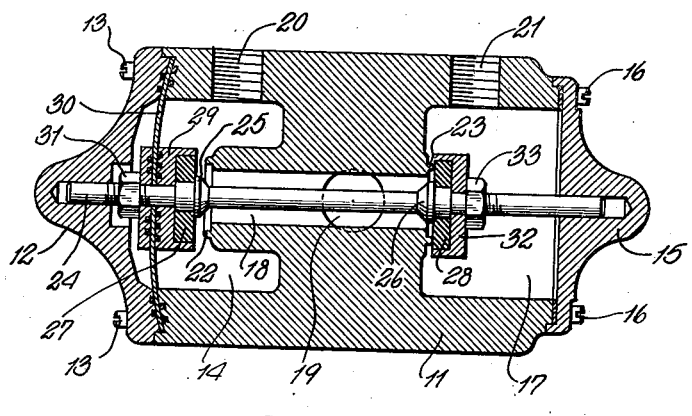
Fig. 2 is a section on the line 2—2 of Fig. 1.

The body 11 is formed with two recesses, one of which cooperates with a cover 12 attached to the body by the bolts 13 to form a chamber 14 while the other cooperates with a cover 15 attached to the body by bolts 16 to form a chamber 17. The two chambers are connected by a passageway 18 with which communicates a port 19 while a port 20 communicates with the chamber 14 and a port 21 communicates with the chamber 17. At the ends of the passageway 18 are formed valve seats 22 and 23 respectively.

A valve stem 24 extends through the passageway 18 and is slidably supported by the covers 12 and 15. The valve stem 24 is formed with the collars 25 and 26 against which are held valve heads 27 and 28 respectively for cooperation with the valve seats 22 and 23. The valve head 27 is mounted in a two-part holder 29 to which also is attached a flexible diaphragm 30, the periphery of which is gripped between the body 11 and the cover 12. A nut 31 threaded on the valve stem 24 engages the outer face of the holder 29 to maintain the holder, diaphragm and head 27 in assembled relation. The valve head 28 is received in a holder 32 and a nut 33 threaded on the valve stem 24 retains the holder of the valve head in assembled relation.

A recess 34 is formed in the body 11 and has a smaller diameter extension 35 which communicates with a passageway 36 extending between the chambers 14 and 17. In the extension 35 is arranged a tubular plug 37 of resilient material and of less diameter than the extension. A passageway 38 in the body 11 and cover 12 provides communication between the recess 34 and the left-hand compartment of the chamber 14. An insert 39 in the recess 34 has a central passageway 40 communicating at one end with the extension 36 and is formed at its other end with a valve seat 41.

In the upper portion of the recess 34 is fitted an annulus 42 to which is attached a non-magnetic sleeve 43. In the sleeve 43 is slidably mounted a magnetic core 44 provided at its opposite ends with resilient insets 45 and 46, the former of which cooperates with the valve seat 41. In the upper end of the sleeve 43 is mounted a magnetic plug 47 formed with a fluid relief passageway 48 at the lower end of which the plug is formed to provide a valve seat 49. An annulus 50 rests on the annulus 42 and is held in such position by a cap 51 suitably attached to the body 11. Within the cap 51 is located an electromagnetic coil 52 surrounding the sleeve 43. A spring 53 biases the core 44 to engage the inset 45 with the valve seat 41 thereby closing the passageway through the inset 39.

In one use of the above-described valve, a source of fluid under pressure is connected to the port 20 and the port 19 is connected to a fluid pressure motor or the like while the port 21 is connected to a discharge pipe. With the coil de-energized, the valve head 28 is held in engagement with the valve seat 23 by the greater leftward directed force acting upon the valve stem 24 due to the greater area of the diaphragm 30 over the valve head 28. The member 37 is held in position to seal that portion of the passageway 36 leading to the chamber 17, and the inset 45 is held on the valve seat 41 by the spring 53. Fluid flows from the port 20 through the passageway 18 to the port 19 until the fluid pressure motor has been fully actuated. Energization of the coil 52 lifts the core 44 to engage the inset 46 with the valve seat 49 and to disengage the inset 45 from the valve seat 41 thereby permitting fluid flow through the passageway 38 into the left-hand compartment of the chamber 14 to disengage the valve head 28 from the valve seat 23 and engage the valve head 27 with the valve seat 22 under the greater rightward force acting on the valve stem 24 due to the excess in area of the left-hand side of the diaphragm and the valve head 28 over the area of the right-hand side of the diaphragm. Communication is thus cut off between the port 20 and the port 19 and is established between the port 19 and the port 21 to permit fluid flow from the fluid pressure motor to the drain pipe. The position of the member 37 remains unchanged. Upon de-energization of the coil 52, the core 44 returns to its original position to seat the inset 45 on the valve seat 41 and disengage the inset 46 from the valve seat 49, thereby permitting flow from the left compartment of the chamber 14 through the passage 38 to the passage 48. The original force differential is re-established on the diaphragm 33 to return the valve stem 24 to its original position in which the head 27 is disengaged from the valve seat 22 and the valve head 28 is engaged with the valve seat 23 thereby again putting the port 20 in communication with the port 19.

The valve may also be used by connecting the port 21 to a source of fluid under pressure and the port 20 to a drain pipe with the port 19 connected to a fluid pressure motor. With such connections, the member 37 is held in position to close that portion of the passageway 33 leading to the chamber 14. The valve is now a normally closed valve rather than a normally open valve. Energization of the coil 52 sets the valve to permit liquid to flow to the fluid pressure motor while de-energization of the coil sets the valve to permit liquid to escape from the motor.

By plugging the port 21, the valve may be converted into a normally open two-way valve. By plugging the port 20, the valve may be converted into a normally closed two-way valve.

I claim:

1. A valve comprising a body defining first and second chambers and a passageway interconnecting said chambers, said passageway having first and second valve seats for controlling fluid flow between said passageway and said first and second chambers respectively, a flexible diaphragm in said first chamber dividing it into a first compartment in communication with said passageway and a second compartment isolated from said passageway except through the hereinafter mentioned first duct means, a reciprocably supported stem connected to said diaphragm having valve members cooperating with said seats, said stem and valve members being adapted in different positions to close one of said seats and maintain the other open, ports communicating with said chambers and with said passageway, first duct means for providing communication between said first and second compartments, a relief passageway communicating with said second compartment, second duct means for providing communication between said second compartment and said second chamber, a valve for selectively controlling fluid flow from said second compartment to said relief passageway or from said first and second duct means to said second compartment, and means for interrupting communication in one of said first and second duct means while opening communication in the other thereof.

2. A valve comprising a body defining first and second chambers and a passageway interconnecting said chambers, said passageway having first and second valve seats for controlling fluid flow between said passageway and said first and second chambers respectively, a flexible diaphragm in said first chamber dividing it into a first compartment in communication with said passageway and a second compartment isolated from said passageway except through the hereinafter mentioned ducts, a reciprocably supported stem connected to said diaphragm having valve members cooperating with said seats, said stem and valve members being adapted in different positions to close one of said seats and maintain the other open, ports communicating with said chambers and with said passageway, a first duct and a relief passageway communicating with said second compartment, a second duct communicating with said first compartment and said first duct, a third duct communicating with said second chamber and said first duct, a valve for selectively controlling fluid flow through one of the said second and third ducts into said second compartment through said first duct or from said second compartment to said relief passageway, and a movable seal operable to interrupt communication between said first duct and one of said second and third ducts while opening communication with the other thereof.

3. A valve as in claim 2 in which said seal comprises a pressure responsive member responsive to pressure in said second chamber to seal said second duct, and responsive to pressure in said first compartment to seal said third duct.

4. A valve comprising a body defining first and second chambers and a passageway interconnecting said chambers, said passageway having first and second valve seats for controlling fluid flow between said passageway and said first and second chambers respectively, a flexible diaphragm in said first chamber dividing it into a first compartment in communication with said passageway and a second compartment isolated from said passageway except through the hereinafter mentioned first duct means, a reciprocably supported stem connected to said diaphragm having valve members cooperating with said seats, said stem and valve members being adapted in different positions to close one of said seats and maintain the other open, ports communicating with said chambers and with said passageway, first duct means for providing communication between said first and second compartments, a relief passageway communicating with said second compartment, second duct means for providing communication between said second compartment and said second chamber, a valve for selectively controlling fluid flow from said second compartment to said relief passageway or from said first and second duct means to said second compartment, and means for interrupting communication in one of said first and second duct means while opening communication in the other thereof comprising a pressure responsive member responsive to pressure in said second chamber to interrupt communication in said first duct means, and responsive to pressure in said first compartment to interrupt communication in said second duct means.

HAL W. McPHERSON.

REFERENCES CITED

The following references are of record in the file of this patent:

UNITED STATES PATENTS

| Number | Name | Date |
|---|---|---|
| 1,583,642 | Bailey | May 4, 1926 |
| 2,218,861 | Stumpf | Oct. 22, 1940 |
| 2,335,923 | Dube | Dec. 7, 1943 |
| 2,427,471 | Osgood | Sept. 16, 1947 |

FOREIGN PATENTS

| Number | Country | Date |
|---|---|---|
| 104,988 | Sweden | of 1942 |
| 216,984 | Switzerland | of 1942 |
| 586,501 | Great Britain | Mar. 20, 1947 |